Oct. 18, 1966   J. J. HORGAN ETAL   3,279,183
VECTORABLE PLUG CLUSTER NOZZLE ROCKET
Filed Sept. 7, 1962   3 Sheets-Sheet 1

INVENTORS
JOHN J. HORGAN
DAVID MIGDAL
BY Vernon F. Hauschild
ATTORNEY

Oct. 18, 1966 J. J. HORGAN ETAL 3,279,183
VECTORABLE PLUG CLUSTER NOZZLE ROCKET
Filed Sept. 7, 1962 3 Sheets-Sheet 2

INVENTORS
JOHN J. HORGAN
DAVID MIGDAL
BY Vernon F. Hauschild
ATTORNEY

Oct. 18, 1966  J. J. HORGAN ETAL  3,279,183
VECTORABLE PLUG CLUSTER NOZZLE ROCKET
Filed Sept. 7, 1962  3 Sheets-Sheet 3
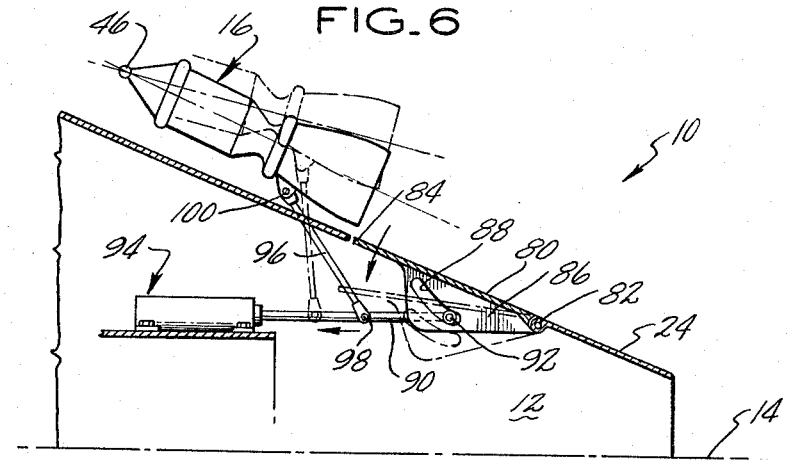
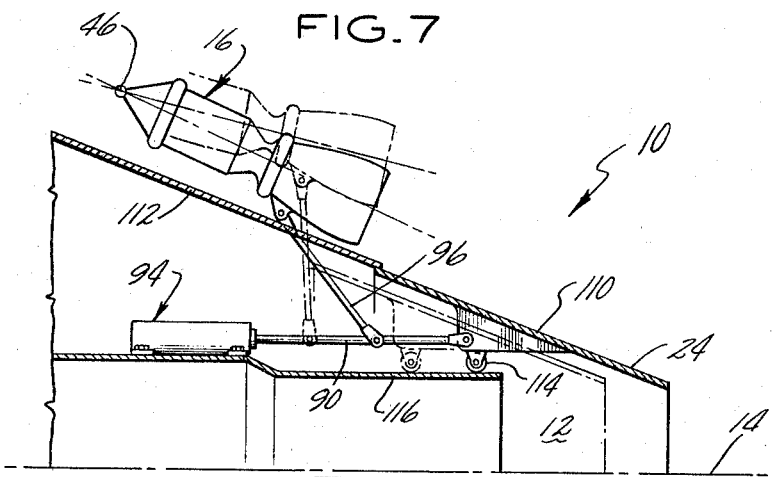
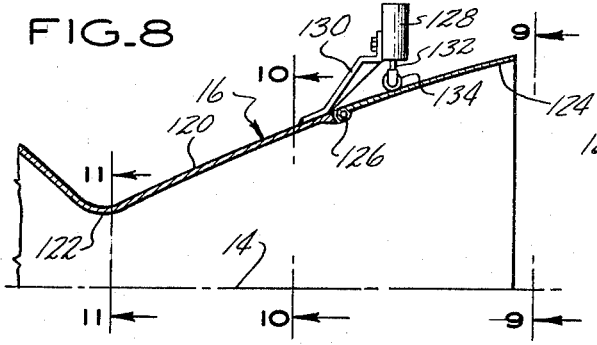
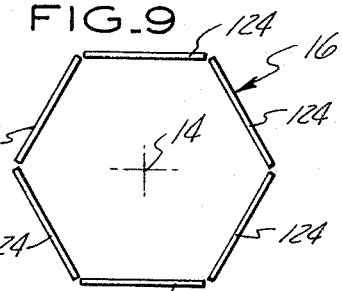
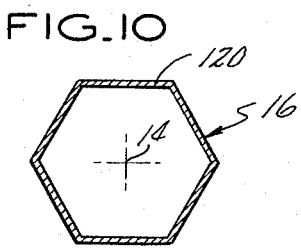
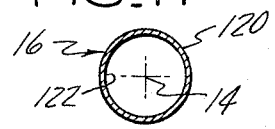
INVENTORS
JOHN J. HORGAN
DAVID MIGDAL
BY Vernon F. Hauschild
ATTORNEY

United States Patent Office 3,279,183
Patented Oct. 18, 1966

3,279,183
VECTORABLE PLUG CLUSTER NOZZLE ROCKET
John J. Horgan, South Glastonbury, and David Migdal, Bloomfield, Conn., assignors to United Aircraft Corporation, East Hartford, Conn., a corporation of Delaware
Filed Sept. 7, 1962, Ser. No. 222,086
2 Claims. (Cl. 60—230)

This invention relates to flight and space vehicle and more particularly to plug cluster nozzle rockets.

The plug cluster nozzle rockets may be used to provide the required thrust for flight and space vehicles for atmospheric as well as vacuum conditions. Such an arrangement reduces the probability of catastrophic failures, reduces development costs and time, permits ease of scaling and ease of manufacture.

It is an object of this invention to teach a plug cluster nozzle rocket including a central plug presenting an expansion surface of circular cross section and tapering rearwardly and a plurality of rocket engines positioned therearound so as to direct the products of combustion, i.e. exhaust gases, of the rocket engine along said expansion surface and which includes provisions to cause the products of combustion of at least one of said rocket engines to separate from the expansion surface and thereby apply an uneven thrust force circumferentially about expansion surface to produce a vectoring effect upon the vehicle.

It is a further object of this invention to teach an apparatus for producing a vectoring effect on a plug cluster nozzle rocket wherein at least one of the rocket engines pivots away from the expansion surface to cause flow separation of rocket exhaust gas from the expansion surface, or wherein a portion of the center plug moves away from at least one of the rocket engines to produce such flow separation or wherein both the rocket engine and the central plug portion move away from one another.

Other objects and advantages will be apparent from the specification and claims and from the accompanying drawings which illustrate an embodiment of the invention.

FIG. 6 is a cross-sectional representation of our invention wherein vehicle vectoring is obtained by pivoting the rocket engine and/or a portion of the central plug away from one another to produce flow separation and hence vectoring.

FIG. 7 is similar to FIG. 6 except that the plug portion translates rather than rotates with respect to the pivotal rocket to produce the desired flow separation.

FIG. 8 is a cross-sectional showing of one of the rocket engines or motors to illustrate how independent vectoring forces may be obtained therefrom.

FIG. 9 is a view taken along line 9—9 of FIG. 8.
FIG. 10 is a view taken along line 10—10 of FIG. 8.
FIG. 11 is a view taken along line 11—11 of FIG. 8.

Figure 1:
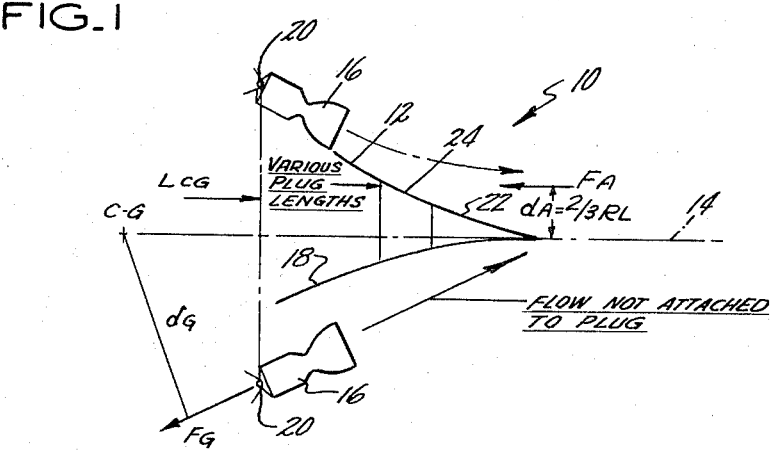
FIG. 1 is a schematic representation of a plug cluster nozzle rocket to illustrate the vectoring forces which are attained by our invention.

FIG. 1 is a schematic representation of a plug cluster nozzle rocket 10 which includes a central plug member 12 of circular cross section and positioned concentrically about axis 14. A plurality of rocket engines or motors 16 are positioned circumferentially about the forward-end 18 of center plug 12 and are capable of pivoting about pivot joint 20, while central plug 12, which tapers toward axis 14 between its forward-end 18 and its after-end 22, is capable of collapsing or moving away from nozzle 16. By discharging the products of combustion from rocket 16 along the expansion surface 24 presented by central plug 12, forward vehicle thrust is produced. It will now be shown mathematically how vectoring is produced by causing flow separation between expansion surface 24 and the exhaust gas of one or more of the rocket engines 16 by either pivoting the rocket engine away from the expansion surface and/or by moving a portion of the plug away from the products of combustion.

Consider two of the rocket motors 16, 180° apart. During unvectored operation the flow from these rocket motors is expanded and directed in the axial direction by the central plug 20. In this case the axial thrust produced by each rocket motor is $F_A$ and the moment produced by this force is $F_A$ multiplied by $d_A$, where $d_A$ is effective distance of the force from the center of gravity (C.G.) of the missile shown at the left of FIG. 1. The moments produced by each of the diametrically opposed rocket motors would then be $F_A$ multiplied by $d_A$ but of opposite sense (i.e. counterclockwise and clockwise) and the net moment about the C.G. is then zero. When one of the rocket motors 16, such as the one in the lower half of FIG. 1 is tilted away from the plug 20, or caused not to follow the plug the following effect is produced:

(1) The upper motor still expands along the plug as before and produces a clockwise moment $F_A$ multiplied by $d_A$ about the C.G.

(2) The gases of the lower motor do not expand along the plug and are not directed along the axis of the motor 14.

(3) The effective force of this lower motor is $F_G$ and its moment arm about the C.G. is $d_G$. Because of the position of this lower motor the effective moment arm $d_G$ is substantially greater than $d_A$. However, the reaction force $F_G$ does not differ appreciably from $F_A$.

(4) The net effect is a large clockwise moment $F_G$ multiplied by $d_G$ offset by only a small counterclockwise moment $F_A$ multiplied by $d_A$.

Figure 2:
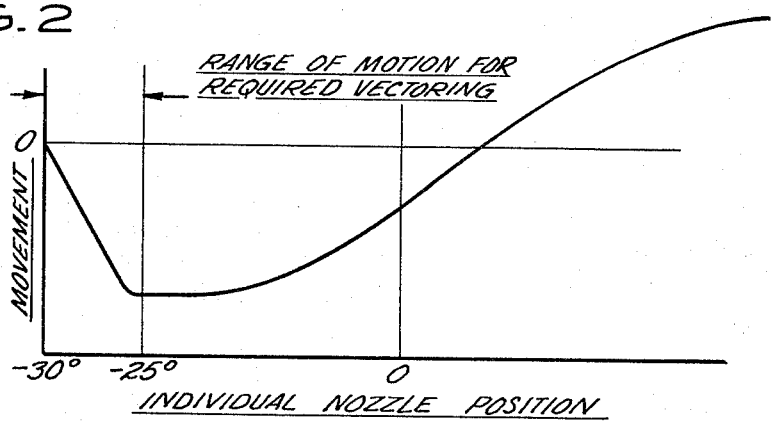
FIG. 2 is a graphic representation of vectoring forces moment plotted against individual nozzle position with respect to the vehicle axis.

FIG. 2 is a graphic representation of the vectoring moment obtained on our flight or space vehicle for changing the position of an individual nozzle angularly with respect to the vehicle axis. The "−30°" illustrated therein is the angle of inclination defined as the angle between the axis of the individual motor 16 and the axis of the complete unit 14. The moment, about the missile C.G., when both motors are inclined 30° is zero as shown in the graph of FIG. 2. As the lower nozzle (or nozzles), shown in the schematic of FIG. 2, is caused to rotate, thereby reducing the angle of inclination, a moment is produced about the missile C.G. The shape of this moment curve versus angle of inclination for movement of one (or a set) of diametrically opposed nozzles is plotted in the graph of FIG. 2. There are two important points to note in this graph:

(1) Slight changes in the initial angle of inclination produces large moments (shown as negative in the graph).

(2) Further changes in the angle of inclination are less effective, eventually leading to a reversal in the direction of the moment as the line of force ($F_g$ of FIG. 1) passes directly through the missile C.G. This reversed direction of vectoring is also attractive for certain applications where large angular movement of the individual motors 16 is feasible.

It will be noted that between "−30°" and "−25°" of individual nozzle position, for the configuration shown the vectoring moment changes from 0 to a value sufficiently large so that no more than 5° of vectoring will be required for most applications.

Figure 3:
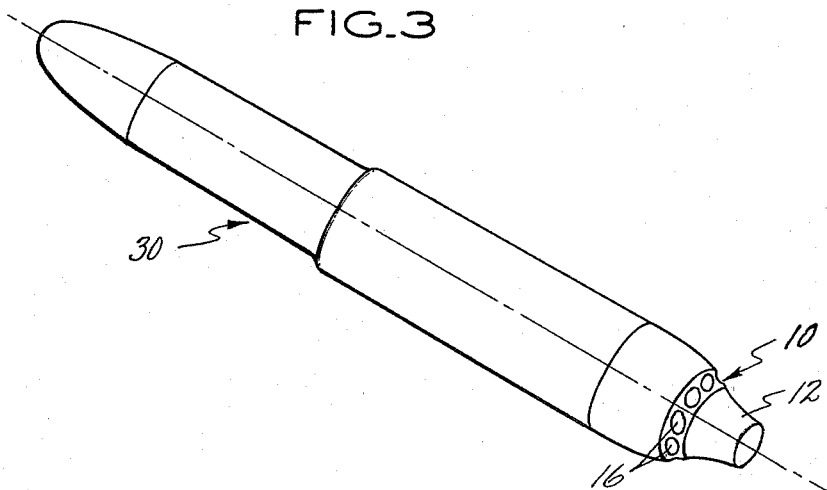
FIG. 3 is a showing of a missile or other flight or space vehicle utilizing our invention.

Referring to FIG. 3 we see how our central plug nozzle rocket 10 including the series of rocket motors 16 and central plug 12 positoned therewithin and forming a part of flight and/or space vehicle 30 which may, for example, be the lower or upper rocket stages of a missile or a series or turbojet and rocket motors in an airplane designed for escape from the earth's atmosphere, or any application whereby a large thrust can be obtained by the use of a series of smaller thrust units.

Figure 4:
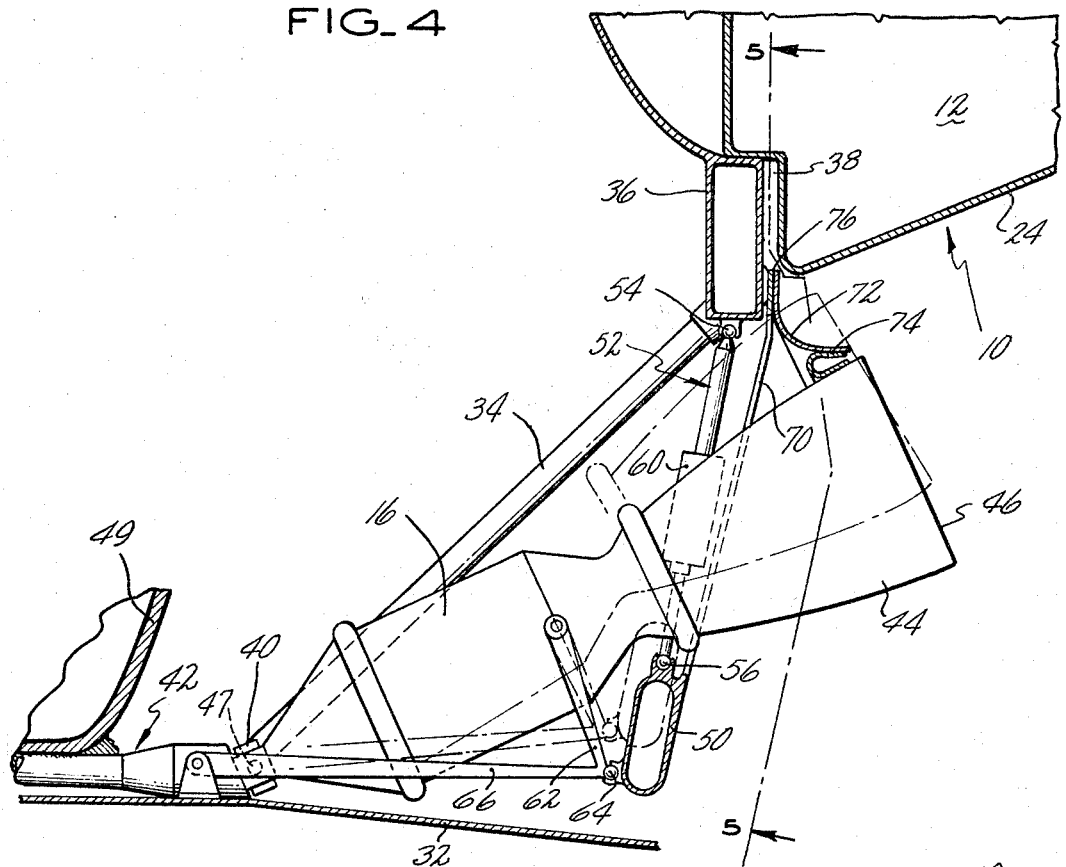
FIG. 4 is an enlarged cross-sectional view taken in a substantially radial plane between adjacent rocket engines to illustrate our invention more clearly.
Figure 5:
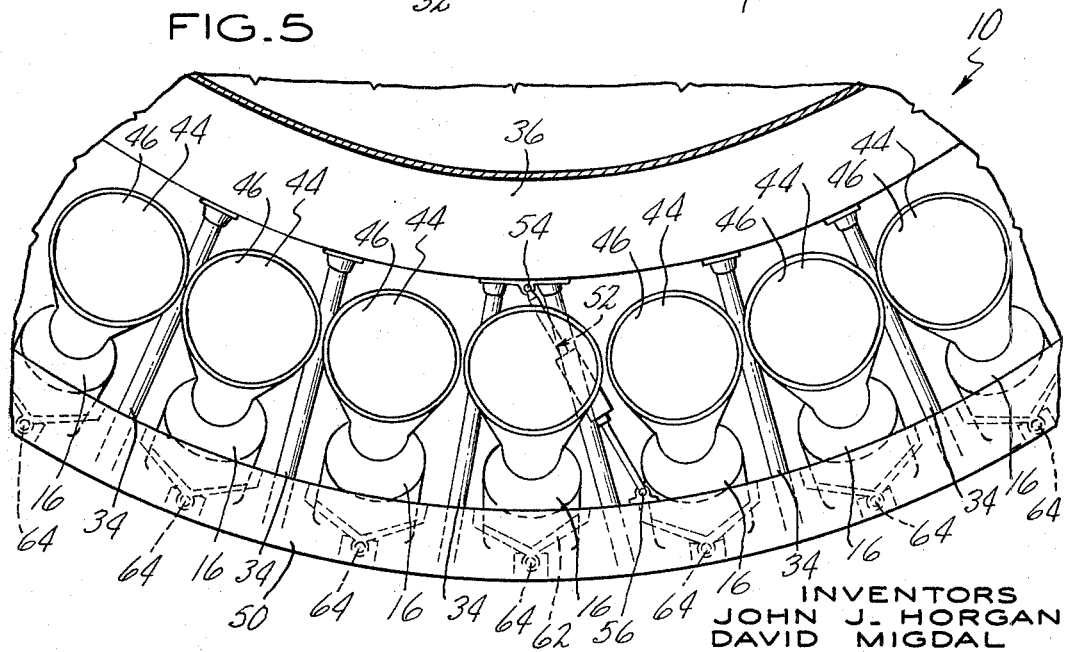
FIG. 5 is a view taken along lines 5—5 of FIG. 4.

Referring to FIGS. 4 and 5 we see our plug cluster nozzle rocket 10, which is of generally circular cross section and concentric about axis 14, and which is positioned within and by outer case 32. Central plug 12 is positioned concentrically within outer case 32 by a plurality of support rods 34, which attach at their inner ends to hollow ring member 36 which is attached to central plug 12 so as to define annular slot 38 therewith. The outer ends of support rods 34 are connected fixedly to fix ring member 40, which is preferably part of frame support mechanism 42, which is attached to outer case 32. It will be noted that support bars 34 are inclined toward axis 14 from their forward to their after-ends such that all thrust forces which are imposed upon central plug 12 by the expansion of exhaust gases along expansion surface 24 will be passed through support rods 34 to the outer case 32 including support frame 42. Each of the rocket motors 16, which may be either of the solid or liquid propellant type, or airbreathing engines, and which include expansion nozzles 44 positioned such that the exhaust gas or products of combustion from rocket motor 16 pass through expansion nozzle 44 and are discharged through outlet 46 to pass along expansion surface 24 and thereby produce thrust creating forces. Each rocket motor 16 is pivotally attached at its forward end through ring 40 to support frame means 42. Accordingly, each rocket motor 16 is pivotable about pivot point 47, preferably just rearward of propellant tanks 49.

The pivotal motion of the rockets 46 is controlled in the FIG. 4 embodiment by unison ring 50, which encircles and envelops all of the rocket motors 16. Unison ring 50 is connected by a plurality of expansion members 52 to hollow ring 36 of central member 12. It will be noted that expansion member 52 is pivotally attached at pivot point 54 to ring 36 and is pivotally attached at pivot point 56 to unison ring 50. Expansion members 52 each include fluid-actuated cylinder-piston units 60 so that as fluid is directed to one or the other side of the piston within unit 60, the unison ring portion shown in FIG. 4 may be moved toward or away from axis 14. It will be obvious that as the portion of unison ring shown in FIG. 4 is moved away from axis 14, the portion of unison ring 50 at a station 180° therefrom will be moved an equal distance toward the axis 14. Unison ring 50 is connected to rocket motor 16 by V-shaped links 62 which are pivotally connected at pivot point 64 to unison ring 50 and which are pivotally connected as best shown in FIG. 5 at 61 to the opposite sides of rocket motor 16. Additionally, link 66 is pivotally connected to unison ring 50 and is pivotally connected at its opposite end to frame means 42. It will therefore be seen that as unison ring 50 is caused to move toward or away from axis 14 by the action of expansion member 52, link means 62 causes rocket motors 16 to pivot about pivot point 46 toward or away from axis 14 and expansion surface 24 of central plug 12. Link 66 serves to position unison ring 50 with respect to support frame means 42.

It will be noted that sealing diaphragm 70 extends from unison ring 50 toward axis 14 while seal members 72 and 74 join the inner-end 76 of seal diaphragm 70 with rocket motors 16. The inner-end 76 of seal diaphragm 70 and seal member 72 enters annular cavity 38 within central plug 12 as unison ring 50 and hence rocket motor 16 moves toward axis 14. The purpose of seal unit 70 is to prevent exhaust gas leakage between center plug 12 and rocket motors 16.

Referring to FIGS. 6 and 7, we see apparatus which will permit individual rocket motors 16 to be pivoted about pivot point 46 or selected groups of rocket motor 16 to be so pivoted. FIGS. 6 and 7 further show embodiments wherein the expansion surface 24 of central plug 12 can be caused to move or collapse away from rocket motor 16. Referring to FIG. 6 we see a rocket motor 16 which is pivotable about pivot point 46 and located radially outward of central plug 12. Central plug 12 includes plug portion 80, which may be of any desired circumferential dimension and which is pivoted at its after-end about pivot point 82 and which is free of the remainder of plug 12 at its forward-end 84. Cam member 86 is attached to the inner surface of flap portion 80 and has cam slot 88 therein. Connecting link or arm 90 carries pin or roller unit 92 at its after-end and member 92 engages cam slot 88. At its forward-end, connecting arm 90 carries a piston which reciprocates within conventional cylinder-piston unit 94 to cause connecting arm 90 to reciprocate in an axial direction and thereby cause flap portion 80 to move from its solid line operable position to its retracted or collapsed position shown in phantom. It will be obvious to those skilled in the art that for installations where it is desired to have the rocket motor 16 stationary, vectoring may be obtained by the actuation of plug portion 80 alone. However, for greater accentuation in vectoring, link 96 may be pivotally connected at pivot point 98 to connecting arm 90 and at pivot point 100 to rocket motor 16 so that the reciprocation of connecting arm 90 by cylinder-piston unit 94 will not only cause the pivoting of flap portion 80, but will also cause the pivoting of rocket motor 16. It will be noted that members 80 and 16 pivot in opposite directions; that is, when one is pivoting in a clockwise direction, the other is pivoting in a counterclockwise direction such that their motion is always algebraically addable.

Referring to FIG. 7, we seen that portion 110 of central plug 12 is free to translate axially with respect to the fixed portion 112 of central plug 12. Again, cylinder-piston unit 94 and connecting arm 90 are used and rollers 114 ride upon cylindrical member 116 to cause plug portion 110 to reciprocate or translate axially between its solid line normal position and its retracted position shown in phantom. Again, connecting link 96 may be used to cause rocket motor 16 to pivot as plug portion 110 translates. As plug portion 110 moves forwardly to its collapsed position, rocket 116 pivots away from axis 14.

If additional vectoring is desired, it might be feasible to fabricate rocket motors 10 as shown in FIGS. 8–11 such that the rocket motor case 120 is circular as shown in FIG. 11 at nozzle throat 122 and gradually changes to the polygon shape shown in FIG. 10 at station 10—10. A plurality of flaps 124 are pivotally attached such as at pivot point 126, one to each side of the polygon such that each is capable of pivoting toward or away from axis 14 due to the action of actuator 128, which may be a conventional cylinder-piston unit attached by frame 130 to case 120. Rod 132, which projects from actuator 128 may be positively attached to its flap 124 so that flap 124 will pivot both inwardly and outwardly therewith or may contact flap 124 through roller 134 in installations where the exhaust gas pressure is to be used to force flap 124 outwardly against roller 134 and arm wherein the flaps 124 are forced inwardly by actuator 128. It will be obvious that by so actuating one or more of the flaps 124, a vectoring force may be obtained on one or all of the rocket motors 16.

Configurations described herein may be of axisymmetric, asymmetrical, or two dimensional as dictated by vehicle design considerations.

It is to be understood that the invention is not limited to the specific embodiment herein illustrated and described but may be used in other ways without departure from its spirit as defined by the following claims.

We claim:
1. A plug cluster nozzle rocket concentric about an axis and including an outer case, a central plug having a forward-end and an after-end and being of circular cross section and shaped to converge toward said axis from its forward to its after-end to present an exhaust gas expansion surface, means to position said plug concentrically within said nozzle and to impart thrust forces imposed upon said plug to said nozzle, a plurality of rocket engines each discharging exhaust gases through a nozzle and located circumferentially about said forward-end of said central plug and positioned to discharge their exhaust gases along said expansion surface of said plug, and means to produce rocket vectoring forces including means to cause said nozzles to pivot with respect to said axis to thereby vary the force of exhaust gas acting against said expansion surface including fixture means pivotally attaching said rocket engines with respect to said case, a unison ring encircling said rocket engines, expandable means pivotally connected to said unison ring and to said plug, linkage means pivotally connected to said unison ring and to opposite side of said rocket engines, and additional linkage means pivotally connected to said unison ring and to said fixture means.

2. Apparatus according to claim 1 and including sealing means extending between said rocket engines and said central plug to prevent gas flow therebetween.

References Cited by the Examiner
UNITED STATES PATENTS

| | | |
|---|---|---|
| 3,057,581 | 10/1962 | Tumavicus. |
| 3,094,072 | 6/1963 | Parilla _____ 60—35.6 |

FOREIGN PATENTS

| | | |
|---|---|---|
| 1,229,596 | 3/1960 | France. |

MARK NEWMAN, *Primary Examiner.*

ABRAM BLUM, *Examiner.*

W. A. SCHUETZ, R. D. BLAKESLEE,
*Assistant Examiners.*